United States Patent

[11] 3,598,453

| [72] | Inventor | Hugh E. Riordan<br>Ann Arbor, Mich. |
|---|---|---|
| [21] | Appl. No. | 797,484 |
| [22] | Filed | Feb. 7, 1969 |
| [45] | Patented | Aug. 10, 1971 |
| [73] | Assignee | Kelsey-Hayes Company<br>Romulus, Mich. |

[54] GRADE-COMPENSATED ACCELEROMETER IN AN ANTISKID SYSTEM
5 Claims, 1 Drawing Fig.

| [52] | U.S. Cl. | 303/21, 137/48, 188/181, 324/70 |
|---|---|---|
| [51] | Int. Cl. | B60t 8/14 |
| [50] | Field of Search | 73/504; 324/70; 137/38, 47, 48; 188/181, 181 A; 303/21 |

[56] References Cited
UNITED STATES PATENTS

| 2,942,864 | 6/1960 | Sikora | 73/504 X |
| 3,494,671 | 2/1970 | Slavin | 303/21 |

Primary Examiner—Milton Buchler
Assistant Examiner—John J. McLaughlin, Jr.
Attorney—Harness, Dickey & Pierce ABSTRACT: An antiskid system in which an output signal X from a linear accelerometer is fed to a memory circuit. The output XI from the memory circuit will follow the input in the absence of a brake application signal Z. Upon occurrences of signal Z the memory circuit will hold the magnitude of signal XI at the magnitude of signal X before braking until signal Z is removed. Signals XI and X are applied to a difference circuit which produces an output signal Y which is X−XI. Signal Y controls a skid control circuit. In this manner accelerometer errors in output as a result of grade variations are minimized.

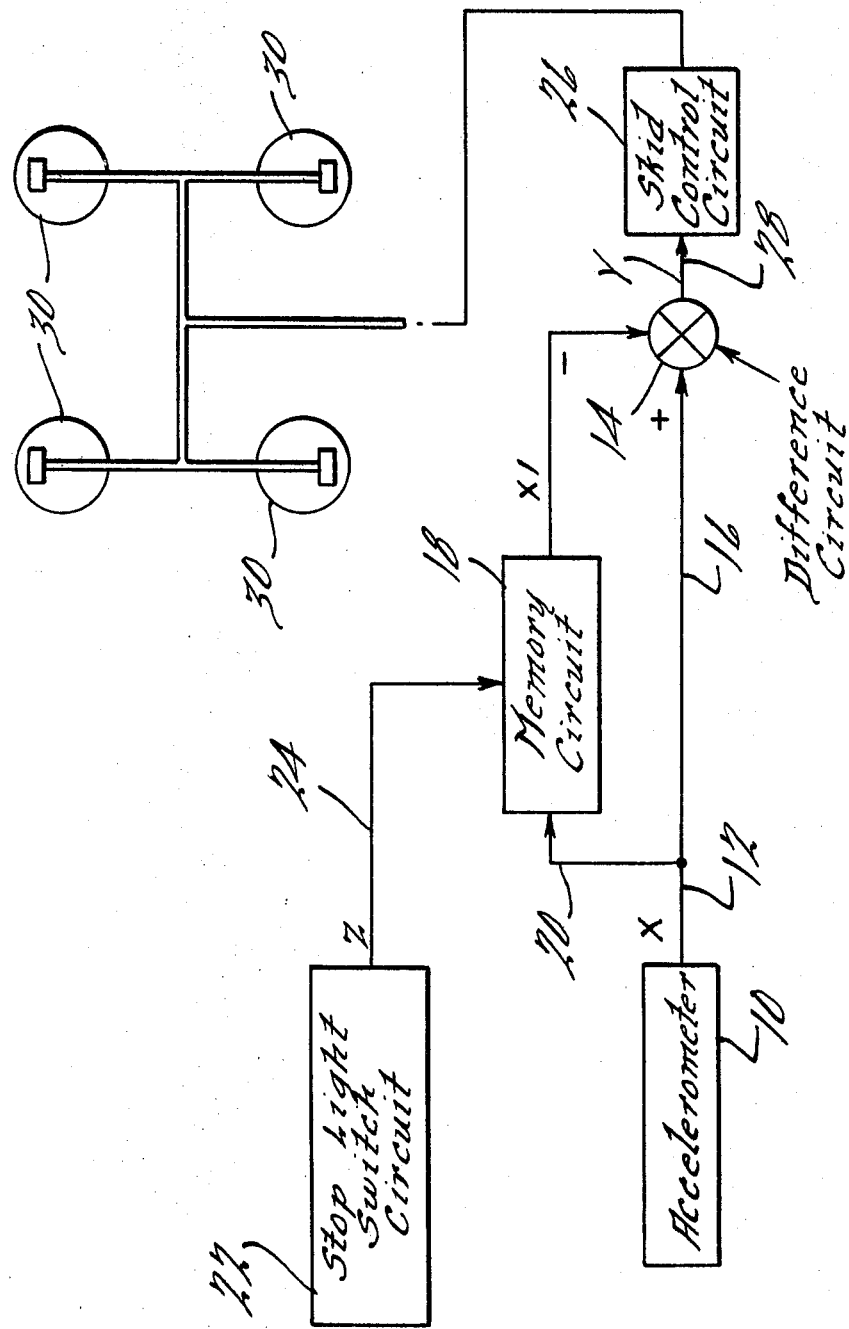

GRADE-COMPENSATED ACCELEROMETER IN AN ANTISKID SYSTEM

SUMMARY BACKGROUND OF THE INVENTION

The present invention relates to accelerometers and more particularly to an accelerometer the output of which is compensated for grade and, more specifically, a grade-compensated accelerometer for use in a skid control system for vehicles.

In some skid control systems for vehicles it is necessary to determine the linear deceleration of the vehicle. Conventional linear accelerometers are sensitive to the grade upon which the vehicle is located and hence provide an erroneous indication reflecting the grade. Conventional accelerometer constructions which are not grade sensitive are quite expensive. In the present invention grade compensation is provided by an inexpensive circuit resulting in a substantially low-cost, grade-compensated accelerometer. Therefore, it is an object of the present invention to provide a grade-compensated accelerometer.

It is another object of the present invention to provide a low-cost grade-compensated accelerometer utilizing a low-cost accelerometer and a compensating circuit.

It is an object of the present invention to provide a novel grade-compensated accelerometer which is specifically advantageous for skid control systems.

Other objects, features, and advantages of the present invention will become apparent from the subsequent description and the appended claims, taken in conjunction with the accompanying drawing which is a block diagram depicting the grade compensated accelerometer.

Looking to the drawing, a conventional (non-grade-compensated) linear accelerometer is indicated by the numeral 10 and provides an electrical output signal X on output line 12. The line 12 is connected to a difference circuit 14 via line 16 and to a memory circuit 18 via line 20.

The output signal X1 from the memory circuit 18 is connected to the difference circuit 14. The difference circuit 14 provides an output signal Y which represents the difference (X−X1) between the output signal X from accelerometer 10 and output signal X1 from the memory circuit 18. Under normal driving conditions the magnitude of signal X1 will be equal to the magnitude of the instantaneous vehicle acceleration signal X. Upon application of the brakes, however, to decelerate the vehicle, the memory circuit 18 will be actuated to store the magnitude of the deceleration signal such that the magnitude of signal X1 will represent the deceleration signal prior to brake application. If the vehicle is on a grade the output signal X1, prior to brake application, will have a magnitude representative of the error in the output from accelerometer 10 resulting from the effect of grade on the accelerometer 10. Thus, when the brakes are applied, the error signal (X1) is stored and subtracted from the instantaneous acceleration signal X and an output signal Y will result which is indicative of true vehicle linear deceleration only.

A stoplight switch circuit 22 can be used to provide an output signal Z to memory circuit 18 via conductors 24. The switch circuit 22 can be connected to the vehicle stoplight switch (not shown) such that signal Z will be provided upon brake application. Memory circuit 18 is constructed such that the output signal X1 will follow input signal X in the absence of brake application signal Z; in response to signal Z the memory circuit 18 will hold the magnitude of signal X just prior to occurrence of signal Z and provide signal X1 at this stored magnitude and X1 will not thereafter vary in magnitude regardless of variations in the magnitude of X until the signal Z is removed, i.e., brakes released. The memory circuit 18 is provided with a time delay to prevent loss of the stored signal X1 in the event of a rapid release and reapplication of the brakes by the vehicle operator. Thus, with the above-described apparatus, a conventional, inexpensive linear accelerometer 10 can be used and an output signal Y provided which is indicative substantially of vehicle deceleration independent of effects of grade on the accelerometer 10.

The above-described apparatus could be used in skid control systems utilizing vehicle (linear) deceleration as a parameter and could be used in a system such as that shown in the copending U.S. Pat. application to R. S. Scharlack, et al., Ser. No. 626,626, filed on Mar. 28, 1967, and that disclosure is incorporated herein by reference.

Thus, the output signal Y is transmitted to a skid control system 26 via conductor 28 and the skid control system 28 in turn is operative to control the brakes 30 of a vehicle in response to occurrence of a skid condition which condition is determined utilizing the linear acceleration signal Y.

Note that the specific details of the stoplight switch circuit 22, memory circuit 18, and difference circuit 14 do not constitute a part of the present invention and are within the purview of one skilled in the art and hence have been omitted for the purpose of simplicity. Note that the accelerometer 10, memory circuit 18 and difference circuit 14 are sensitive to either acceleration or deceleration and the output signal Y will provide an indication of the magnitude of such acceleration or deceleration of the vehicle; thus, in the preceding description where "acceleration" is used it is understood to include "negative acceleration" or deceleration and vice versa.

While it will be apparent that the preferred embodiment of the invention disclosed is well calculated to fulfill the objects above stated, it will be appreciated that the invention is susceptible to modification, variation and change without departing from the proper scope or fair meaning of the invention.

What I claim is:

1. A grade-compensated accelerometer for a vehicle having a brake system actuable to decelerate the vehicle comprising: an accelerometer for providing a first output signal indicative of the acceleration of the vehicle, memory means responsive to said first output signal for providing a second output signal having a magnitude determined by the magnitude of said first output signal, said memory means being responsive to application of the brake system of the vehicle for providing said second output signal of a magnitude indicative of the magnitude of said first output signal prior to application of the brake system, output circuit means responsive to said first and second output signals for providing a third output signal having a magnitude determined by the magnitudes of said first and second output signals.

2. The device of claim 1 with said output circuit means providing said third output signal as a function of the difference between said first and second output signals.

3. In the device of claim 2 for use with a vehicle having a brake light switch, said memory means responsive to actuation of the brake light switch to provide said second signal as a function of the magnitude of said first output signal prior to application of the brake system.

4. The device of claim 2 with said memory means storing the magnitude of said first signal in response to application of the brake system and providing said second signal to have a magnitude as a function of said stored magnitude.

5. In combination with the device of claim 1 skid control system means responsive to said third output signal for controlling the brake system of the vehicle in response to the occurrence of a skid condition determined as a function of said third output signal.